Jan. 12, 1943.                J. MERCIER                2,308,380
                            HYDRAULIC MOTORS
                          Filed May 8, 1941                5 Sheets-Sheet 1

Jan. 12, 1943.  J. MERCIER  2,308,380
HYDRAULIC MOTORS
Filed May 8, 1941  5 Sheets-Sheet 2

Inventor
Jean Mercier
By
Singer Ehlert Stern & Carlberg
Attys.

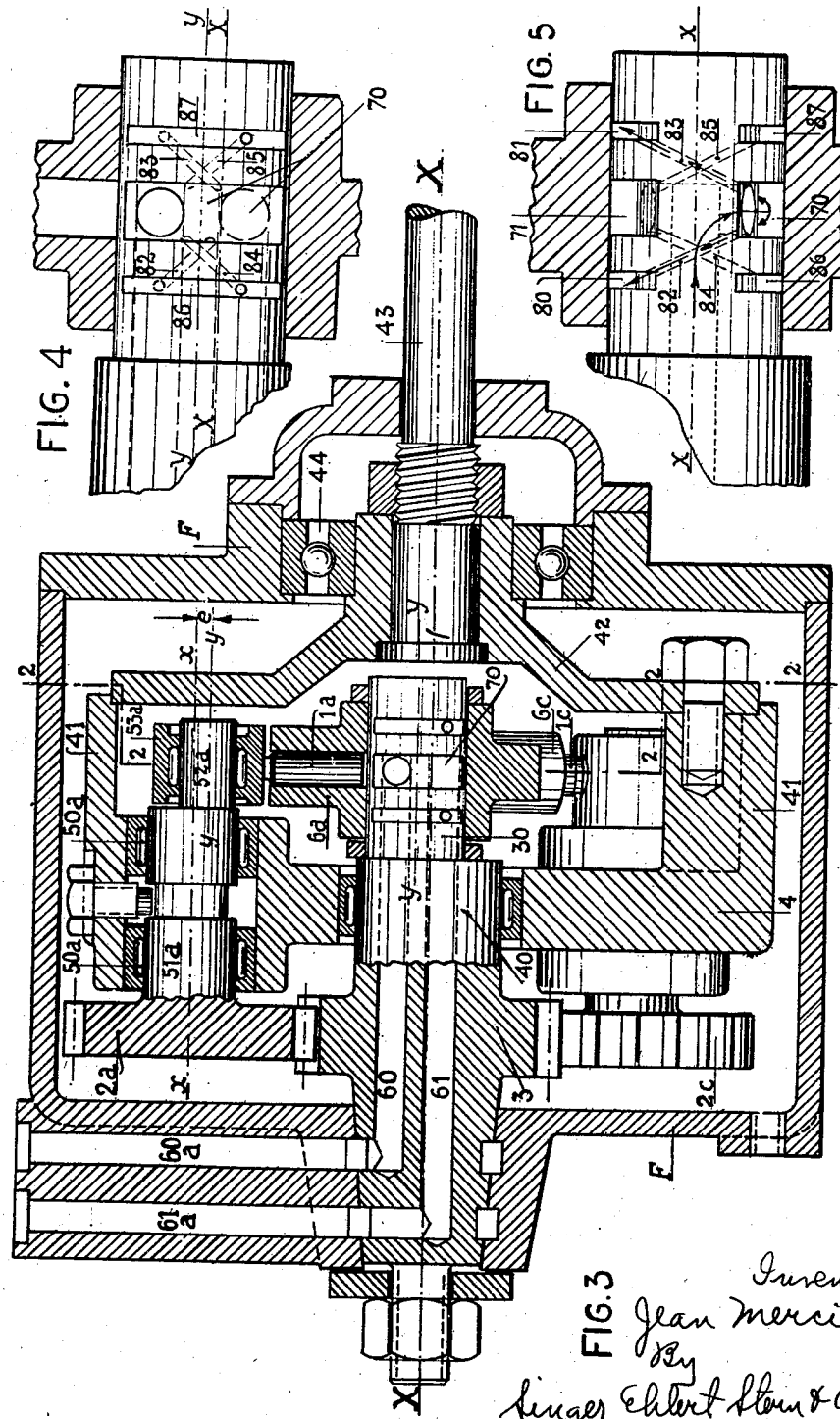

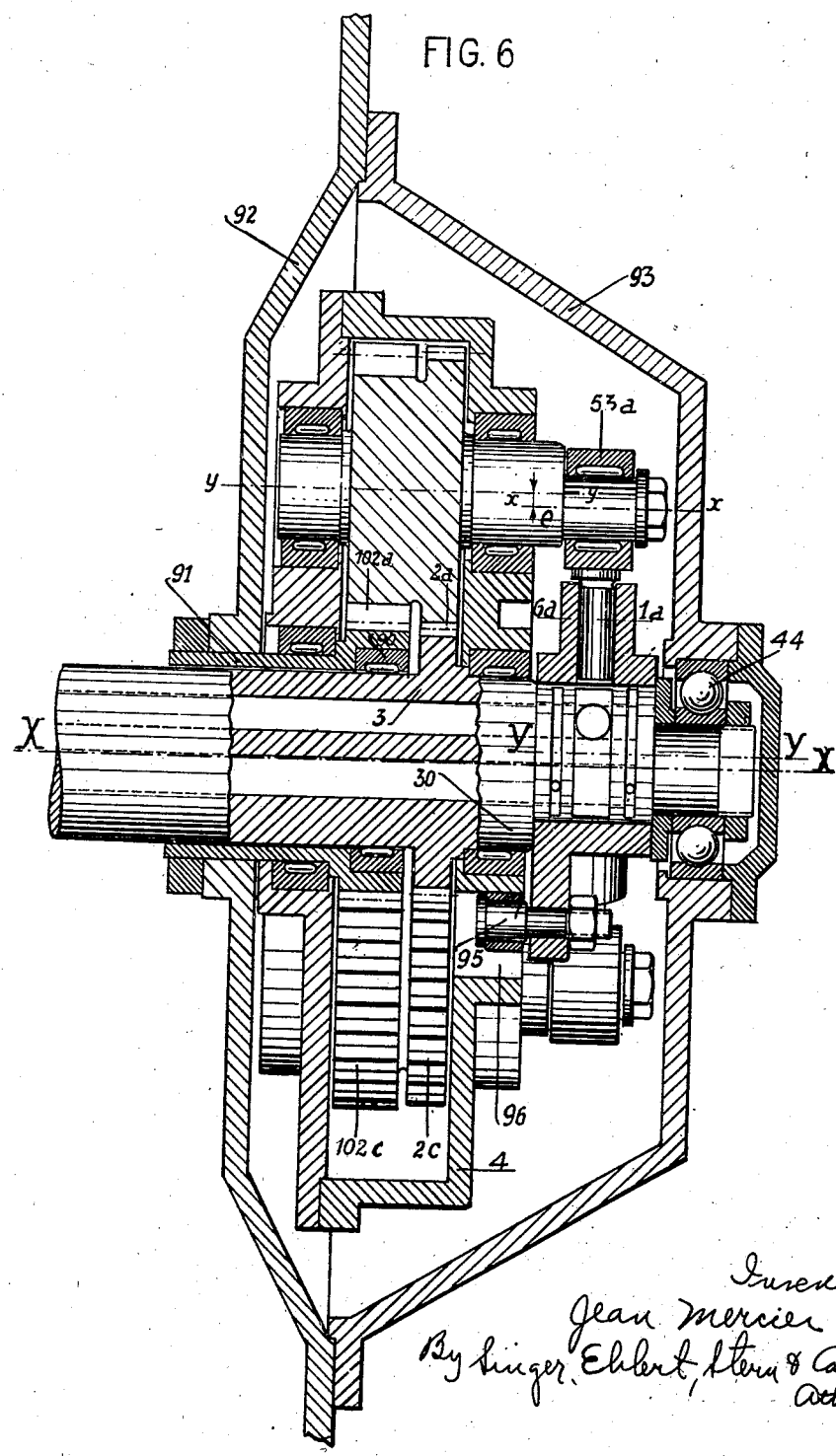

Jan. 12, 1943.　　　J. MERCIER　　　2,308,380
HYDRAULIC MOTORS
Filed May 8, 1941　　　5 Sheets-Sheet 5

Patented Jan. 12, 1943

2,308,380

UNITED STATES PATENT OFFICE 2,308,380

HYDRAULIC MOTOR

Jean Mercier, Paris, France; vested in the Alien Property Custodian

Application May 8, 1941, Serial No. 392,581
In France January 6, 1941

13 Claims. (Cl. 121—59)

The present invention relates to machines including sliding elements, such for instance as a cylinder-piston system, and it is more especially concerned, among these machines, with motors and chiefly hydraulic motors.

The object of the invention is to provide a machine of this type which is better adapted to meet the requirements of practice and in particular in which the rectilinear reciprocating movement of the sliding system or systems brings into play only strictly axial stresses, the means for transforming the rectilinear movement into circular movement including elements as studs or pins adapted to rotate along the inner surface of cooperating elements as rings or collars, both being rotated about different axes and at such speed that no appreciable lateral stresses will be exerted on the sliding system.

According to a feature of the present invention, the cylinder-piston system is arranged in such manner that these two elements slide in each other along a line perpendicular to a first axis, one of these elements being located at a fixed distance from said axis. The other element, or any sliding part associated therewith, is journalled about a second axis parallel to the first axis. These two axes are adapted to move, one with respect to the other, as if they were respectively fixed, with the same eccentricity, with two circles, of the same diameter, rolling one on the other without sliding in a plane perpendicular to these axes, the different parts being mounted with respect to one another in such manner that the common perpendicular intersecting both of the axes is always parallel to the line passing through the centers of the two circles and to the axis of sliding displacement of the system. Preferably, this perpendicular line will be confounded with this axis of sliding displacement.

Of course, it will be advantageous to make use of a plurality of cylinder-piston systems, for instance by arranging them radially about the first axis above mentioned.

Other features of the present invention will result from the following detailed description of some specific embodiments thereof.

Preferred embodiments of the present invention will be hereinafter described, with reference to the accompanying drawings, given merely by way of example, and in which:

Fig. 3 is a sectional view on the line 3—3 of Fig. 2;

Fig. 4 is an elevational view of the distributing means of the motor of Figs. 2 and 3, the cylinder unit being cut along a vertical plane passing through the line X—X of Fig. 5;

Fig. 5 is a plan view corresponding to Fig. 4, the cylinder unit being cut along a vertical plane passing through the line Y—Y of Fig. 4;

Fig. 6 is an axial section of another embodiment of my invention;

In the following description, I have shown the invention applied to the construction of a hydraulic motor.

The cylinder and piston system is arranged in such manner that these two elements can slide in each other along a straight line intersecting an axis which is perpendicular thereto, one of the two elements above mentioned, that is to say the piston or the cylinder, being fixed with respect to this axis. The other of these two elements, that is to say the cylinder or the piston, respectively, or any sliding structure associated with this second element, is journalled about an axis parallel to the first. The two axes move with respect to each other as if they were rigid with two circles of the same diameter rolling on each other without sliding in a plane perpendicular to these axes, the distances from the axes to the centers of the circles being equal respectively and the common perpendicular intersecting the two axes being parallel to the line joining the centers of the circles.

Of course, it is possible, in various embodiments of the invention, to mount in a frame some of the pieces above mentioned, the others moving with respect to them in said frame and it will be understood that there exists a great number of possible arrangements within the scope of this system.

In particular, it seems advantageous, especially in the case of a hydraulic motor, to dispose a plurality of cylinder and piston systems radially about the first mentioned axis.

Figure 1:
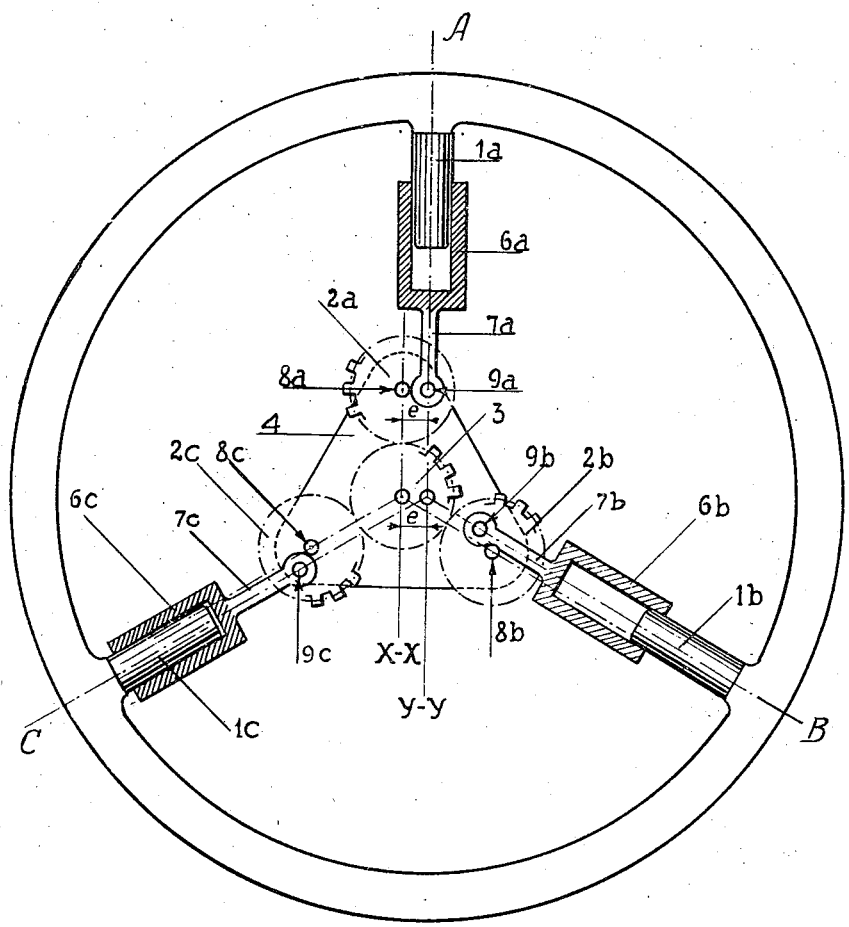
Fig. 1 is a diagrammatical view, in transverse section, illustrating the principle of the invention.

I have indicated, by way of example, such an arrangement in Fig. 1, in which the cylinder and piston systems 6a—1a, 6b—1b, 6c—1c are disposed radially about the axis Y—Y in question, which is perpendicular to the plane of the drawing.

In the embodiment shown by way of example, in this Fig. 1, it has been supposed that pistons 1a, 1b, 1c were all disposed at a fixed distance from axis Y—Y, while cylinders 6a, 6b, 6c move along radial lines Y—A, Y—B, Y—C respectively. Each of these cylinders carries a rod 7a, 7b, 7c, respectively, rigid therewith and journalled about an axis 9a, 9b, 9c, which is the second axis above mentioned.

Each of these axes 9a, 9b, 9c is carried with an eccentricity e by a pinion 2a, 2b, 2c, respectively.

The three pinions 2a, 2b, 2c roll each on a central wheel 3 of a diameter equal to the common value of the diameters of said pinions, this central wheel having its center on axis X—X and carrying axis Y—Y with the same eccentricity e. For this purpose, pinions 2a, 2b, 2c are mounted on a frame 4, rotary about the axis X—X with respect to the central wheel 3; the axes 8a, 8b, 8c of these pinions are carried by this frame 4, all at the same distance from axis X—X, this distance being such that pinions 2a, 2b, 2c are in mesh with the central wheel 3. The mounting is such that the straight line passing through the center X of wheel 3 and the center of each pinion 2a, 2b, 2c is parallel to the line going from the point Y to the corresponding journal axis 9a, 9b, 9c.

This system may be mounted in different manners.

In the first case, wheel 3 is fixed in space and pinions 2a, 2b, 2c roll on this wheel. On the other hand, the cylinder and piston systems 6a—1a, 6b—1b, 6c—1c turn about the axis Y—Y while keeping their relative angular positions with respect to one another.

The result of the rotary motion of the sliding and the rotary system with respect to each other is that the piston heads journalled about axis 9a, 9b, 9c travel around the pinion centers 8a, 8b, 8c without appreciable oblique reaction.

I will obtain a hydraulic motor if, through any suitable means, I introduce into each cylinder a liquid under pressure when the pistons are near the inner ends of their strokes and during the displacement of the cylinders toward the center of the system and if, on the other hand, the liquid is allowed to escape from the cylinders during the opposed strokes.

I will receive the motion of this motor either on a shaft having an axis Y—Y, associated to the angular movement of the cylinders about this axis, or on a shaft having an axis X—X associated to the rotation of frame 4.

In another case, the pistons are fixed in space. The ends 9a, 9b, 9c of rods 7a, 7b, 7c carried by the cylinders then move with a reciprocating motion along lines Y—A, Y—B, and Y—C. Wheel 3 is given a rotary movement about axis X—X. Finally, frame 4 is given a translatory movement analogous to that of an eccentric strap, due to the rotation of its center X—X about axis Y—Y, the pinions 2a, 2b, 2c carried by this frame still rolling on central wheel 3 in such manner that the points 9a, 9b, 9c of these pinions describe the reciprocating rectilinear movement above mentioned. In this case, if the inflow and outflow of fluid under pressure to and from the cylinders are controlled in the manner above indicated, I also obtain a hydraulic motor the movement of which will be received on a shaft Y—Y rigid with wheel 3.

In the third case, frame 4 is fixed. The central wheel 3 turns about the axis X—X. The whole of the cylinders is given a translatory movement such that each point of the axis Y—Y on which the axes of the three pistons and cylinders intersect together describes a circle about the corresponding point of axis X—X. As for pinions 2a, 2b, 2c, they are caused to turn about their respective centers 8a, 8b, 8c, while rolling on wheel 3.

This system will therefore constitute a hydraulic motor if I provide the inlet and outlet means above defined and if the movement of the motor is received on a shaft of axis X—X and rigid with wheel 3.

Figure 2:
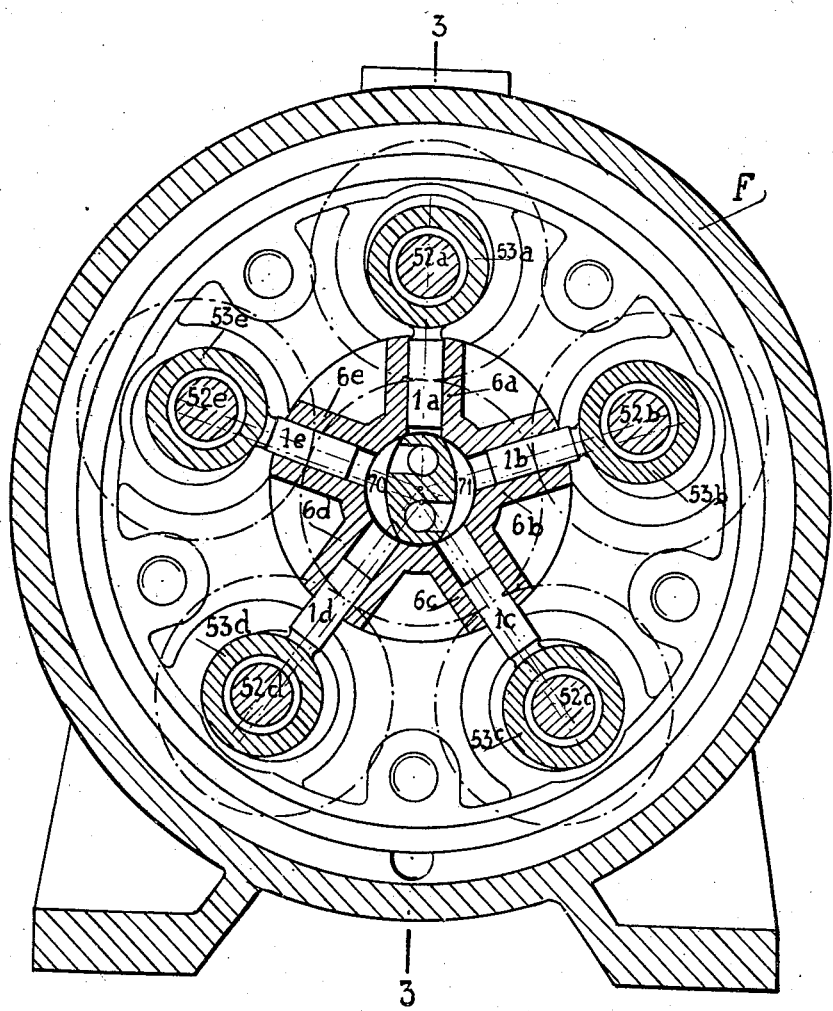
Fig. 2 is a sectional view on the line 2—2 of Fig. 3.

In any of the arrangements which have been described, I may place pinions 2a, 2b, 2c in the central part of the machine, that is to say between axis X—X and the cylinder and piston systems. This is the arrangement disclosed by the diagrammatical view of Fig. 1. I may also place these pinions 2a, 2b, 2c on the other side of the cylinder and piston systems with reference to axis X—X and I have shown in Figs. 2 and 3 an embodiment of such an arrangement.

In this embodiment, the motor includes five cylinder and piston systems; all the cylinders, to wit 6a, 6b, 6c, 6d, 6e, form a single unit turning about a shaft 30 of axis Y—Y and rigid with wheel 3. In this embodiment, it has been supposed that the central wheel 3 is fixed in the frame F which supports it. A plate 4 is journalled on a bearing 40 of axis X—X which, in this case, is also fixed with respect to frame F. This plate 4 carries pinions such as 2a, corresponding each to one of the above mentioned cylinders. In Fig. 3, it is possible to see only two of these pinions, to wit 2a and 2c.

These pinions are mounted on needle bearings such as 50a in plate 4 and their axes 51a, etc. extend on either side of this plate. Taking for instance the case of pinion 2a, the axis 51a of this pinion carries, at its end opposed to pinion 2a, a crank pin 52a constituted by a cylindrical element the axis y—y of which is at a distance e from the axis x—x of wheel 2a equal to the distance between axes Y—Y and X—X. Each piston such as 1a carries, at its external part, a collar 53a surrounding the corresponding crank pin 52a.

Finally plate 4 is connected through a cylindrical extension such as 41 to a disc 42 keyed on shaft 43. This shaft 43 is itself mounted, through ball bearing 44, in one of the side plates of frame F.

With this construction, I have obtained a motor the principle of which corresponds to the diagrammatic showing of Fig. 1; pinions 2a, 2b, 2c, etc. roll on wheel 3, plate 4 rotating about axis X—X. Due to this movement, the crank pins such as 52a, etc., same as the pistons such as 1a, etc., which correspond thereto, have a reciprocating movement with respect to the respective cylinders such as 6a, the whole of these cylinders turning about axis Y—Y.

In the embodiment that has been shown, and which is supposed to correspond to the case of a hydraulic motor, I admit into the cylinders a fluid under pressure which produces the reciprocating displacements above mentioned and it is this movement of the pistons in the cylinders which is transmitted to the crank pins such as 52a and, as consequence of the motion to which the whole is subjected due to the rolling of the pinions such as 2a on wheel 3, causes the whole of plate 4 to rotate about axis X—X.

Therefore the motion of the motor is collected on shaft 43, rigid with plate 4 and journalled in the frame F of the motor.

Concerning the means for admitting the fluid under pressure into the cylinders, said means may of course be of any suitable nature. For instance, in the arrangement shown by Fig. 1, I might provide valves controlled in such manner as to produce the inflow and outflow of the fluid to and from these cylinders.

I may also take advantage of the relative movement of two of the parts of the engine for constituting a distributor which controls the inflow and outflow of the liquid with respect to the cylinders.

Such an arrangement has been shown in Figs. 2 to 5.

In this embodiment, the fixed part which includes shaft 30, bearing 40 and wheel 3 is provided with two conduits, an inlet conduit 60 and an outlet conduit 61. These two conduits communicate with the corresponding conduits 60a and 61a provided in frame F. Shaft 30 is provided, opposite the openings of the cylinder unit (6a, 6b, etc. . . . 6e) with two notches 70 and 71 into which conduits 60 and 61 open, respectively. Therefore it will be understood that, owing to this arrangement, the cylinders, such as 6e and 6d are brought into communication, through notch 70, with the inlet conduit 60, these cylinders being those in which the piston is moving outwardly. On the contrary, from the time when the cylinders have moved past the vertical plane of symmetry which corresponds to the sectional plane 3—3 and come for instance in the position shown at 6e, these cylinders are brought into communication with notch 71, which is connected to the outlet conduit 61. This is the case of cylinders 6c, 6b, the respective cylinders 2c, and 2b, of which move inwardly. In the drawing, cylinder 6a is represented in the neutral position, that is to say it is in communication neither with the inlet nor with the outlet, its piston 2a being at the end of its inward stroke.

As the liquid in notch 70 is a liquid under pressure, while the liquid in notch 71 is a liquid connected to the outlet, it follows that, if precautions were not taken, there would be produced, between the distributing rotary valve and the cylinder unit, a disymmetrical thrust perpendicular to axis X—X. In order to avoid this drawback, I therefore provide, on either side of notch 71, two small notches 80 and 81 connected through inclined conduits 82 and 83, formed in the body 30 of the distributor, with notch 70, whereby the pressure of the liquid arriving into 70 is transmitted, through these notches 80 and 81, and acts simultaneously along two diametrically opposed generatrices of the central bore of the cylinder unit.

In order to obtain full symmetry, I will similarly connect, through inclined conduits 84 and 85, notch 71 with two small notches 86 and 87 located on either side of notch 70.

It will be readily understood that, as the reciprocating displacement of the pistons in their cylinders is produced through the effect of a series of pinions such as 2a, rolling on a central wheel 3, there may take place a certain play, which will correspond to a slight stopping of the relative movement at the end of each stroke of the piston, since, at this time the direction of the stresses is reversed. But as this corresponds to a reversing of the direction in which the liquid is circulating in the cylinders, this stopping of the relative movement (which takes place, for instance, when each piston is in the position shown at 2a in Fig. 2) makes it possible to give notches 70 and 71 a size such that there is a slight overlapping of the orifice of the cylinder. On the other hand, this absence of relative motion of the piston and of the cylinder at the end of each stroke avoids wiredrawing of the liquid.

Figure 7:
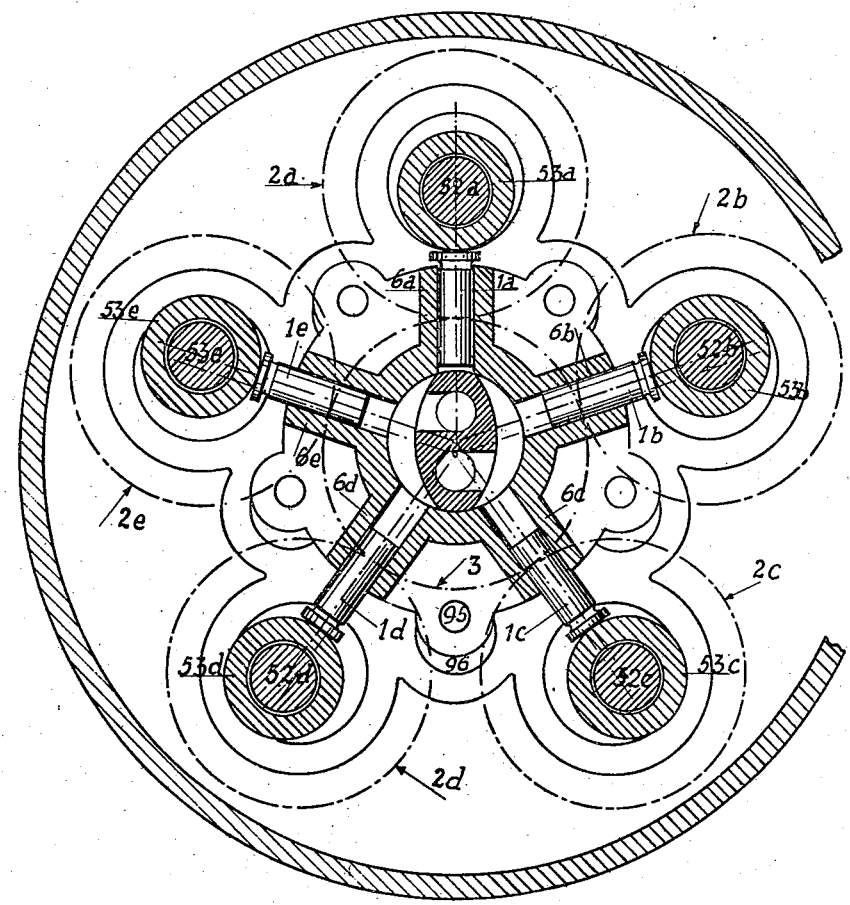
Fig. 7 is a transverse section corresponding to Fig. 6.

In the embodiment of Figs. 6 and 7, I have more particularly shown the application of a system of the type above described with reference to Figs. 2 to 5 to the driving of the wheel of an automobile vehicle.

Shaft 30 constitutes the stub axle of the wheel. As above described, it carries the central wheel 3 in mesh with pinions 2a, 2b, 2c, etc., the principle of the movement being that above described. But in the embodiment that is now being described, each of these pinions 2a, 2b, 2c, etc. is rigid with another pinion 102a, 102b, 102c, etc., and these last mentioned pinions are all in mesh with a central pinion 90 rigid with a sleeve 91 mounted loose on 30 and on which the web 92 of the wheel is fixed. This web carries, fixed thereon, a frusto-conical part 93 turning, through the intermediate of a ball bearing 44, on the end of stub axle 30, about axis X—X. It will be seen that the system of pinions 102a, 102b, 102c, etc. constitutes, in combination with the central pinion 90, a movement transmission device owing to which the movement of the hydraulic motor carried by axle 30 is transmitted to the wheel with the desired reduction.

It will be noted that, in this embodiment, pinions 2a, 2b, 2c, etc., instead of being mounted in overhanging relation with respect to plate 4 as in the embodiment of Fig. 3, are carried by two trunnions such as 51a and 51b, located on either side of said pinions.

According to another characteristic of the invention, shown by Figs. 6 and 7 and which can be applied separately, pistons 6a, 6b, 6c, 6d, 6e, instead of being rigid with the corresponding annular elements 53a, 53b . . . 53e, bear merely against these elements, in such manner as to be connected thereto in a non-positive manner, i. e. to be merely able to push these elements toward the outside.

This does not modify the operation of the motor, but, in this case, I must provide a connection or coupling between the rotary movements of plate 4 on the one hand and of the cylinder unit on the other hand, these rotation movements taking place about respective different axes, to wit X—X for plate 4 and Y—Y for the cylinder unit.

This coupling can be obtained in any suitable manner, for instance by means of connecting rods interposed between these parts, by Oldham joints, etc. In the embodiment shown by the drawings, the cylinder unit carries fingers or studs, such as 95, mounted in such manner as to slide inside corresponding cylindrical holes 96 provided in plate 4.

Whatever be the particular embodiment that is chosen, a hydraulic motor made according to the invention as above described has considerable advantages among which the following may be cited:

The action of the liquid under pressure on the pistons and the connections which determine the working of the pistons in their respective cylinders never produce oblique stresses transmitted from the piston to the cylinder or inversely. Therefore, I obtain a considerable reduction of the friction between the piston and the cylinder.

I can therefore obtain a much better fluidtightness and, above all, I reduce to a minimum the wear of the pistons and of the cylinders resulting from their relative displacements.

In the embodiments above described, I have supposed that the cylinder and piston systems were arranged radially. But it should be well understood that I might, without changing anything to the principle of the invention, arrange all these cylinder and piston systems in line, placing them in such relative working positions that they can all act on a common shaft.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A machine which comprises, in combination, a plurality of piston and cylinder systems mounted radially about an axis, a sun wheel having its axis parallel and distinct from said first mentioned axis, a plurality of planet wheels of the same diameter as said sun wheel adapted to roll thereon without sliding, one of the elements of each piston and cylinder system being at a fixed distance from said first mentioned axis, means for keeping the other element of each system at a fixed distance from one eccentric point of one of said planet wheels, respectively, the distance from said eccentric point to the center of the corresponding wheel being equal to the distance between said two axes, said eccentric point being so chosen that the line passing therethrough and intersecting the first mentioned axis perpendicularly thereto is parallel to the line passing through the center of the corresponding planet wheel and intersecting the second mentioned axis perpendicularly thereto.

2. A machine which comprises, in combination, a plurality of piston and cylinder systems mounted radially about an axis, a sun wheel having its axis parallel to and distinct from said first mentioned axis, a plurality of planet wheels of the same diameter as said sun wheel adapted to roll thereon without sliding, one of the elements of each piston and cylinder system being at a fixed distance from said first mentioned axis, the other element of each system being journalled to one of said planet wheels respectively about an eccentric point thereof, of an eccentricity equal to the distance between said two axes and so chosen that the line passing therethrough and intersecting the first mentioned axis perpendicularly thereto is parallel to the line passing through the center of the corresponding planet wheel and intersecting the second mentioned axis perpendicularly thereto.

3. A machine which comprises, in combination, a plurality of piston and cylinder systems mounted radially about an axis, a sun wheel having its axis parallel to and distinct from said first mentioned axis, a plurality of planet wheels of the same diameter as said sun wheel adapted to roll thereon without sliding, one of the elements of each piston and cylinder system being at a fixed distance from said first mentioned axis, a crank pin on each planet wheel of an eccentricity equal to the distance between said two axes, the position of the center of this crank pin being so chosen that the line passing therethrough and intersecting the first mentioned axis perpendicularly thereto is parallel to the line passing through the center of the corresponding planet wheel and intersecting the second mentioned axis perpendicularly thereto, and means for keeping each second element and the corresponding crank pin radially applied against each other.

4. A machine according to claim 3 in which the last mentioned means include means for causing the whole of the piston and cylinder systems on the one hand and the whole of the planet wheels on the other hand to turn in synchronism about the first mentioned axis and the second mentioned axis respectively.

5. A machine according to claim 3 in which all the first mentioned elements of the piston and cylinder systems form a single unit adapted to turn about the first mentioned axis, and a support for the axes of said planet wheels rotatable about said second mentioned axis, and means for causing said unit and said support to turn in synchronism about their respective axes of rotation.

6. A hydraulic motor which comprises, in combination, a plurality of pistons and cylinder systems mounted radially about an axis, a sun wheel having its axis parallel to and distinct from said first mentioned axis, a plurality of planet wheels of the same diameter as said sun wheel adapted to roll thereon without sliding, one of the elements of each piston and cylinder system being at a fixed distance from said first mentioned axis, means for keeping the other element of said system at a fixed distance from one eccentric point of one of said planet wheels, respectively, the distance from said eccentric point to the center of the corresponding wheel being to the distance between said two axes, said eccentric point being so chosen that the line passing therethrough and intersecting the first mentioned axis perpendicularly thereto is parallel to the line passing through the center of the corresponding planet wheel and intersecting the second mentioned axis perpendicularly thereto, means for feeding liquid under pressure to the cylinders in which the piston is moving away from the cylinder head, and means for allowing liquid to escape from the cylinders in which the pistons are moving in the opposed direction.

7. A motor according to claim 6 in which said sun wheel is stationary and the first mentioned elements of the cylinder and piston systems are the cylinders turning as a whole about the first mentioned axis further including a common support for the axes of the planet wheels rotatable about said second mentioned axis and a shaft, for transmitting the power developed by said motor, driven by said support and turning about said second mentioned axis.

8. A motor according to claim 6 in which said sun wheel is stationary and the first mentioned elements of the cylinder and piston systems are the cylinders turning as a whole about the first mentioned axis further including a common support for the axes of the planet wheels rotatable about said second mentioned axis and a shaft, for transmitting the power developed by said motor, driven by said support and turning about said second mentioned axis, the last mentioned means of claim 6 including inlet and outlet conduits provided in the hub of said sun wheel, and a distributing member rigid with said sun wheel and provided with an inlet and an outlet recess adapted to cooperate with the cylinder orifices and communicating with said inlet and outlet conduits, respectively.

9. A motor according to claim 6, in which said sun wheel is stationary and the first mentioned elements of the cylinder and piston systems are the cylinders turning as a whole about the first mentioned axis further including a common support for the axes of the planet wheels rotatable about said second mentioned axis, other planet wheels coaxially rigid with said first mentioned planet wheels respectively but of different diameters, a second sun wheel coaxial with the first and adapted to cooperate with all of said second mentioned planet wheels, and a shaft, for transmitting the power developed by said motor, rigid with said second mentioned sun wheel.

10. A motor according to claim 6, in which said piston and cylinder systems are disposed on the other side from the corresponding eccentric points of said planet wheels from said sun wheel.

11. A motor according to claim 6, in which said piston and cylinder systems are disposed on the same side of the corresponding eccentric points of said planet wheels as said sun wheel.

12. A motor according to claim 6, in which said piston and cylinder systems are disposed on the same side of the corresponding eccentric points of said planet wheels as said sun wheel, said sun wheel being disposed centrally of the motor.

13. In combination, a motor according to claim 6, in which said sun wheel is stationary and the first mentioned elements of the cylinder and piston systems are the cylinders turning as a whole about the first mentioned axis further including a common support for the axes of the planet wheels rotatable about said second mentioned axis, and a shaft, for transmitting the power developed by said motor, driven by said support and turning about said second mentioned axis, a stub axle rigid with said sun wheel, and a vehicle wheel mounted on said stub axle and coupled with said shaft, whereby said motor is carried by said vehicle wheel and housed therein.

JEAN MERCIER.